2,900,414
SYNTHESIS OF ARYLBORON HALIDES

Earl L. Muetterties, Chadds Ford, Pa., assignor to E. I. du Pont de Nemours and Company, Wilmington, Del., a corporation of Delaware No Drawing. Application June 3, 1957
Serial No. 662,971

6 Claims. (Cl. 260—543)

This invention relates to organoboron compounds. More particularly, it relates to a new method for making arylboron halides.

Arylboron halides are a known type of organoboron compounds that are of use in various applications, for example, as intermediates in the formation of heterocyclic boron compounds and arylboronic acids, and as ionic polymerization catalysts. However, the hitherto known methods for making arylboron halides are relatively complex and are not economically attractive for manufacturing such compounds on a large scale.

It is therefore an object of this invention to provide a new and improved method for making arylboron halides. A further object is provision of an extremely simple and economical method for making arylboron halides. Still another object is provision of a novel process for preparing arylboron halides from readily available raw materials.

These objects are accomplished in accordance with the present invention by a process which comprises contacting a boron halide whose halogen has an atomic number of at least 17, i.e., boron trichloride, tribromide or triiodide, with an aromatic hydrocarbon having hydrogen on at least one of the annular carbons at a temperature of from about 0° to about 200° C. in the presence of aluminum and aluminum chloride.

Aluminum is preferred for use in the process of this invention since it gives the best conversions to arylboron halides and since it is the most active.

The proportions of reactants employed in the process are not critical and can be varied widely. Molar ratios of aromatic hydrocarbon having hydrogen on at least one of the annular carbons to boron halide that are operable range from 1:5 to 5:1. Similarly, the molar ratios of boron halide to aluminum or aluminum chloride can vary from 1:40 to 40:1.

The use of a catalyst in the process of this invention is not essential. However, it is sometimes beneficial to use a catalyst such as iodine, methyl iodide or mixtures of these in any proportion. The amount of catalyst employed can range from about 0.1% up to about 2% of the weight of the reaction mixture.

The process of this invention is conveniently carried out in a corrosion-resistant reaction vessel capable of withstanding superatmospheric pressure and equipped with means for heating the reaction mixture to temperatures up to about 200° C. and means for cooling the reaction mixture to a temperature of about 0° C. A pressure vessel lined with stainless steel is satisfactory for use in this process.

The reaction vessel is charged with the non-gaseous reactants, e.g., aluminum or aluminum chloride and the aromatic hydrocarbon having hydrogen on at least one of the annular carbons, and optionally a catalyst. The reaction vessel is then cooled to between 0° and −78° C., evacuated, and the gaseous reactant, e.g., boron trichloride, is introduced and the reaction vessel closed.

The closed reaction vessel is then brought to the desired operating temperature. With the more reactive aromatic hydrocarbons having hydrogen on at least one of the annular carbons, e.g., benzene, in the presence of a catalyst, e.g., iodine, an exothermic reaction may take place when the reaction mixture reaches a temperature of just above 0° C. In such cases the reaction mixture temperature rises to about 120° C. in a few minutes.

Reaction takes place very rapidly at temperatures above 100° C. and the reaction mixture can be cooled immediately after such temperatures are reached. If desired, the reaction mixture can be maintained at lower temperatures by external cooling but in this case longer reaction times may be required. Since temperatures above 150° C. tend to cause decomposition of the arylboron dihalide, it is preferred to employ short contact times at the higher temperatures, i.e., at temperatures of 120° C. and higher. For example, contact times of 1–60 minutes at temperatures of 120–200° C. are preferred.

After the reaction mixture has been heated at the desired temperature for the desired time, the reaction vessel is cooled to room temperature, i.e., 20–30° C. The reaction vessel is opened and the reaction mixture, which usually consists of a slurry of solid and liquid products, is filtered and the filtrate is distilled to recover any unused reactants and to isolate the reaction products. In some cases, the reaction mixture may consist solely of solid product.

The process of this invention is also quite capable of being carried out continuously by passing liquid and gaseous reactants through a reactor containing aluminum particles or chloride of said aluminum heated to the desired temperature. This embodiment of the process is particularly desirable for carrying out the reaction at temperatures of 150–200° C. since short contact times are more easily maintained.

The reactants used in the process of this invention can be of the grades commercially available. The aluminum can be of any of the types and degrees of purity commercially available, for example, aluminum powder, granules, or turnings of various sizes are operable. Because of more rapid reaction rates and generally higher conversions obtained, it is preferred to use aluminum particles having as high a surface area per unit weight as practical.

The process of this invention is illustrated in further detail by the following examples in which the proportions of ingredients are expressed in parts by weight unless otherwise specified.

Example 1

A stainless steel-lined pressure vessel is charged with 35 parts of aluminum dust, 120 parts of benzene and 0.1 part of iodine. The vessel is cooled to −78° C. and then evacuated. Sixty parts of boron trichloride is distilled into the reaction vessel after which the reaction vessel and its contents are allowed to warm up. On reaching a temperature of about 3° C., an exothermic reaction sets in. The interior temperature flashes up to 120° C. during the period of about 10 minutes. The vessel is immediately cooled, about 20 minutes being required to reach room temperature (25° C.). The reaction mixture is a liquid slurry amounting to 213 parts. This slurry is filtered and there is obtained 130 parts of filtrate and 35–40 parts of solid. The X-ray diffraction pattern of this solid shows the presence of aluminum and aluminum trichloride. The liquid reaction product is distilled and after removing 70 parts of benzene there is obtained 54 parts of phenylboron dichloride, boiling at 95° C./48 mm.

Example II

Following the procedure described in Example I, the reaction vessel is charged with 120 parts of benzene, 60 parts of boron trichloride, 35 parts of aluminum dust, 0.1 part of iodine, and 0.1 part of methyl iodide. The reaction vessel is heated to 150° C. during a period of about 45 minutes and is then immediately cooled back to room temperature (about 25° C.) during a period of about 1½ hours. The reaction mixture is filtered and the filtrate, amounting to 210 parts, is distilled. Three fractions are obtained, the first being benzene, the second a mixture of benzene and phenylboron dichloride, and the third fraction, amounting to 59 parts, being phenylboron dichloride, boiling at 95° C./48 mm.

*Analysis.*—Calc'd for $C_6H_5BCl_2$: C, 45.3%; H, 3.17%; B, 6.82%; Cl, 44.7%. Found: C, 46.23%, 45.87%; H, 3.61%, 3.54%; B, 7.39%, 7.56%; Cl, 44.28%, 44.31%.

A portion of the phenylboron dichloride of Example II is contacted with an ice-water mixture whereupon the boron compound hydrolyzes instantaneously. The resulting product is recrystallized from diethyl ether. Infrared analysis of the hydrolysis product shows it to be phenylboric acid.

*Analysis.*—Calc'd for $C_6H_5B(OH)_2$: C, 59.1%; H, 5.77%. Found: C, 58.86%; H, 6.04%.

Example III

Following the procedure described in Example I, the reaction vessel is charged with 50 parts of aluminum dust, 120 parts of boron trichloride, 40 parts of benzene, 0.1 part of methyl iodide, and 0.1 part of iodine. The closed reaction vessel is heated to 150° C. during a period of about 45 minutes and cooled to room temperature during 1½ hours. There is isolated from the reaction vessel 166 parts of a liquid slurry. The slurry is filtered and the filtrate is distilled. There is obtained 30 parts of phenylboron dichloride, boiling at 132° C./169 mm.

*Analysis.*—Calc'd for $C_6H_5BCl_2$: C, 45.3%; H, 3.17%; Cl, 44.7%. Found: C, 44.99%; H, 3.43%; Cl, 44.24%.

Example IV

A pressure vessel is charged as in the preceding examples with 120 parts of benzene, 60 parts of boron trichloride, and 80 parts of aluminum trichloride. The closed reaction vessel is heated to 150° C. during a period of about 45 minutes and is then immediately cooled, room temperature being reached in about 1½ hours. The reaction product is a fuming liquid slurry amounting to 240 parts. This slurry is filtered and 30 parts of the filtrate is distilled. There is obtained 2.5 parts of phenylboron dichloride, boiling at 98° C./50 mm.

Example V

The pressure vessel is charged as described in Example 1 with 125 parts of toluene, 60 parts of boron trichloride, 35 parts of aluminum dust, 0.1 part of iodine, and 0.1 part of methyl iodide. The closed reaction vessel is maintained at room temperature for a period of 14 hours and is then heated to 150° C. during 30 minutes and immediately cooled to room temperature during about 1½ hours. The reaction mixture amounts to 215 parts of a liquid slurry. This slurry is filtered and there is obtained about 50 parts of solid and about 150 parts of liquid. The X-ray diffraction pattern of the solid shows that it consists mainly of aluminum with a moderate amount of aluminum chloride. The liquid filtrate is distilled and after recovering 60 parts of toluene there is obtained 53 parts of a liquid boiling at 105° C./31 mm. This product is tolylboron dichloride, which on redistillation boils at 42° C./0.8 mm.

*Analysis.*—Calc'd for $C_7H_7BCl_2$: C, 48.6%; H, 4.07%; B, 6.27%; Cl, 41.0%. Found: C, 49.02%; H, 4.07%; B, 6.81%; Cl, 40.95%.

Example VI

Following the procedure described in Example I, a reaction vessel is charged with 120 parts of p-xylene, 60 parts of boron trichloride, 35 parts of aluminum dust, 0.1 part of methyl iodide, and 0.1 part of iodine. The closed reaction vessel is heated to 150° C. during a period of 45 minutes and is immediately cooled to room temperature during another 1½ hours. The reaction mixture is a liquid slurry amounting to 212 parts. This slurry is filtered and 60 parts of this filtrate is distilled. There is obtained a fraction boiling at 158° C./110 mm. consisting mainly of xylylboron dichloride, contaminated with a little xylene.

*Analysis.*—Calc'd for $C_8H_9BCl_2$: C, 51.3%; H, 4.85%; B, 5.78%; Cl, 37.9%. Found: C, 55.71%; H, 6.24%; B, 5.10%; Cl, 33.61%.

A portion of the impure xylylboron dichloride of Example VI is hydrolyzed by treatment with excess water and the hydrolysis product is recrystallized from diethyl ether.

Example VII

A pressure vessel is charged as described in Example I with 100 parts of naphthalene, 30 parts of aluminum dust, 0.1 part of iodine, 0.1 part of methyl iodide, and 60 parts of boron trichloride. The closed reaction vessel is heated at 100° C. for a period of 4 hours and is then cooled to room temperature during about 1½ hours. The reaction vessel on opening yields no gaseous products and there is present 190 parts of a gummy solid containing naphthylboron dichloride.

Example VIII

A reaction vessel is charged as in the preceding examples with 80 parts of biphenyl, 120 parts of boron trichloride, 35 parts of aluminum dust, 0.1 part of iodine and 0.1 part of methyl iodide. The closed reaction vessel is heated to 150° C. during 45 minutes and is immediately cooled to room temperature during a period of about 1½ hours. The reaction product is a gummy solid amounting to 226 parts. This product contains biphenylboron dichloride and some biphenylene-bis(boron dichloride). The product is distilled and there is obtained one fraction boiling at 210° C./1 mm. (biphenylboron dichloride) and another fraction boiling at 230° C./less than 1 mm. [the biphenylene-bis(boron dichloride)].

The examples have illustrated the process of this invention by reference to the reaction of certain aromatic hydrocarbons having hydrogen on at least one of the annular carbons with certain boron halides and with aluminum and aluminum chloride. However, it will be understood that arylboron dihalides can also be prepared from other aromatic hydrocarbons having hydrogen on at least one of the annular carbons and other boron halides. Thus, other specific aromatic hydrocarbons having hydrogen on at least one of the annular carbons that are operable in the process of this invention include o- and m-xylene, ethylbenzene, mesitylene, cymene, p-diphenylbenzene, anthracene, 1,2,5-trimethylnaphthalene, and phenanthrene. As indicated previously, operable boron halides include boron trichloride, boron tribromide and boron triiodide.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which my exclusive property or privilege is claimed are defined as follows:

1. A process for preparing arylboron halides which comprises contacting a boron trihalide, whose halogens have an atomic number of at least 17, with an aromatic hydrocarbon having hydrogen on at least one of the annular carbons at a temperature of from about 0° to about 200° C. in the presence of a member of the group consisting of aluminum and aluminum chloride.

2. Process of claim 1 wherein the molar ratios of aromatic hydrocarbon having hydrogen on at least one of the annular carbons to boron halide are within the range of from 1:5 to 5:1, and the molar ratios of boron halide to aluminum or aluminum chloride are within the range of from 1:40 to 40:1.

3. Process of claim 1 wherein a catalyst selected from the group consisting of iodine, methyl iodide, and mixtures thereof, is present in an amount of from about 0.1% to about 2% of the weight of the reaction mixture.

4. A process for preparing arylboron halides which comprises reacting a boron trihalide, whose halogens have an atomic number of at least 17, with an aromatic hydrocarbon having hydrogen on at least one of the annular carbons at a temperature within the range of 0° to 200° C. and in the presence of aluminum.

5. Processs of claim 4 wherein the boron trihalide is boron trichloride.

6. A process for preparing arylboron halides which comprises heating at a temperature of from 120° to 200° C. for a period of from 1 to 60 minutes, a boron trihalide whose halogens have an atomic number of at least 17 in the presence of an aromatic hydrocarbon having hydrogen on at least one of the annular carbons and a member of the group consisting of aluminum and aluminum chloride.

References Cited in the file of this patent

Pace: Chem. Abstracts, vol. 24, p. 1360 (1930).